(12) United States Patent
Ord et al.

(10) Patent No.: US 10,296,080 B2
(45) Date of Patent: May 21, 2019

(54) SYSTEMS AND METHODS TO SIMULATE USER PRESENCE IN A REAL-WORLD THREE-DIMENSIONAL SPACE

(71) Applicant: Disney Enterprises, Inc., Burbank, CA (US)

(72) Inventors: Tracia Ord, Santa Clarita, CA (US); Patrick Hovsepian, Glendale, CA (US); Anna Singer, Los Angeles, CA (US); Jocelyn McDowell, Burbank, CA (US); Jillian Foster, Riverside, CA (US); Christopher Abbey, Pasadena, CA (US); Anthony Accardo, Los Angeles, CA (US); Stephanie Glover, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/627,243

(22) Filed: Jun. 19, 2017

(65) Prior Publication Data

US 2018/0364799 A1     Dec. 20, 2018

(51) Int. Cl.
*G06F 3/01* (2006.01)
*G06T 19/00* (2011.01)

(52) U.S. Cl.
CPC .......... *G06F 3/011* (2013.01); *G06T 19/006* (2013.01)

(58) Field of Classification Search
CPC .......... G06F 3/011; G06F 3/005; G06F 3/013; G06F 3/04815; G06F 17/3079; G06F 3/012; G06T 19/006; G06T 2200/04; G06T 2207/10004; G06T 2207/30196; G06T 2219/024; G02B 27/017; G06K 9/00671; G06K 9/00664; A63F 13/216

See application file for complete search history.

(56) References Cited

U.S. PATENT DOCUMENTS

| | | | |
|---|---|---|---|
| 7,948,481 | B2 | 5/2011 | Vilcovsky |
| 8,872,854 | B1 | 10/2014 | Levitt |
| 9,092,061 | B2 | 7/2015 | Elmekies |
| 9,240,077 | B1 | 1/2016 | Kraft |
| 9,348,141 | B2 | 5/2016 | Bar-Zeev |
| 9,350,924 | B2 | 5/2016 | Posa |
| 9,904,055 | B2 | 2/2018 | Burns |
| 2012/0038671 | A1 | 2/2012 | Min |
| 2012/0105473 | A1 | 5/2012 | Bar-Zeev |
| 2013/0145272 | A1 | 6/2013 | Boggie |
| 2013/0178257 | A1 | 7/2013 | Langseth |
| 2014/0354690 | A1 | 12/2014 | Walters |
| 2015/0016777 | A1 | 1/2015 | Abovitz |

(Continued)

FOREIGN PATENT DOCUMENTS

WO     2017108699     6/2017

OTHER PUBLICATIONS

Shaoib, Huma, et al., A Survey of Augmented Reality, Artificial Intelligence and Multidisciplinary (AIM) Research Lab, Research Gate, retrieved on Nov. 1, 2016, 10 pages.

(Continued)

*Primary Examiner* — Haixia Du
(74) *Attorney, Agent, or Firm* — Esplin & Associates, PC (57) ABSTRACT

This disclosure presents systems and methods to simulate user presence in a real-world three-dimensional space.

18 Claims, 5 Drawing Sheets

(56) References Cited

U.S. PATENT DOCUMENTS

| | | | |
|---|---|---|---|
| 2015/0235370 A1* | 8/2015 | Abovitz | G06K 9/00671 |
| | | | 382/103 |
| 2015/0371447 A1 | 12/2015 | Yasutake | |
| 2016/0026253 A1 | 1/2016 | Bradski | |
| 2016/0189334 A1 | 6/2016 | Mason | |
| 2016/0292535 A1 | 10/2016 | Thorn | |
| 2016/0300387 A1 | 10/2016 | Ziman | |
| 2017/0160815 A1 | 6/2017 | Glazier | |
| 2017/0169598 A1 | 6/2017 | York | |
| 2017/0169610 A1 | 6/2017 | King | |
| 2018/0059902 A1 | 3/2018 | Martin | |
| 2018/0096528 A1 | 4/2018 | Needham | |
| 2018/0101985 A1 | 4/2018 | Jones-McFadden | |
| 2018/0361260 A1 | 12/2018 | Ord | |
| 2018/0364799 A1 | 12/2018 | Ord | |

OTHER PUBLICATIONS

Smith, David, This may be the most impressive use of Apple's new AR software yet, Business Insider (Jul. 11, 2017) retrieved from: http://www.businessinsider.com/apple-arkit-portal-video-2017-7.

Rukeja, Sumeet, Building AR Portal: A Door to Fascinating AR Experience, Yudiz (May 22, 2018) retrieved from: https://www.yudiz.com/building-ar-portal-a-door-to-fascinating-ar-experience/.

Advanced Micro Devices, Inc. (May 25, 2018), AMD Technology Enabling ARwall's Real-Time Virtual Set Extension Tools [Video file], Retrieved from https://www.youtube.com/watch?v=cC7iPZatS1E.

* cited by examiner

SYSTEMS AND METHODS TO SIMULATE USER PRESENCE IN A REAL-WORLD THREE-DIMENSIONAL SPACE

FIELD

This disclosure relates to systems and methods to simulate user presence in a real-world three-dimensional space.

BACKGROUND

Users may not be able to attends events (e.g., concerts, award shows, and/or other events) for many reasons. However, those users may wish to engage with an event even when they are not physically present at the event.

SUMMARY

One aspect of the disclosure relates to a system configured to configured to simulate user presence in a real-world three-dimensional space. The simulation of user presence may be accomplished by aggregating a representation of the user (e.g., an image of the user, such as a self-portrait photograph (e.g., a "selfie"), and/or other physical representations) with a representation of the real-world three-dimensional space (e.g., a digital model). The user may be at a different location than a location in the real-world three-dimensional space in which the user's presence may be simulated. The aggregate of the representation of the real-world three-dimensional at a first location and the representation of the user physically present at a second location may include representation of the user depicted as being present within the representation of the first location in the real-world three-dimensional space.

The system may include one or more of one or more servers, one or more computing platforms, and/or other components. The one or more servers may include one or more physical processors. The one or more servers 102 may communicate with one or more computing platforms via client/server architecture, and/or other communication schemes. The one or more physical processors may be configured by machine-readable instructions. Executing the machine-readable instructions may cause the one or more physical processor to facilitate simulating user presence in a real-world three-dimensional space. The machine-readable instructions may include one or more computer program components. The computer program components may include one or more of a space component, a user component, an orientation component, an aggregation component, and/or other components.

The space component may be configured to obtain space information, and/or other information. Space information may define a representation of a real-world three-dimensional space at a first location in the real-world three-dimensional space. The first location in the real-world three-dimensional space may include one or more of objects, people, and/or other entities present in and/or moving through the real-world three-dimensional space.

The user component may be configured to obtain user information and/or other information. User information may be derived from output signals generated by an image sensor of a computing platform associated with a user and/or other sources. The user information may define a representation of the user in the real-world three-dimensional space at a second location in the real-world three-dimensional space. The representation of the user may represent one or more of an appearance of the user, a pose of the user, and/or other user features.

The orientation component may be configured to obtain orientation information, and/or other information. Orientation information may be derived from output signals generated by an orientation sensor of the computing platform. The orientation information may define an orientation of the computing platform at the second location in the real-world three-dimensional space.

The aggregation component may be configured to generate image information and/or other information. Image information may define an image. Image information may be generated based on one or more of space information, user information, orientation information, and/or other information. The image may depict an aggregate of a representation of the user and a representation of the first location. The representation of the user may be depicted in the image as being present at the first location in the real-world three-dimensional space.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
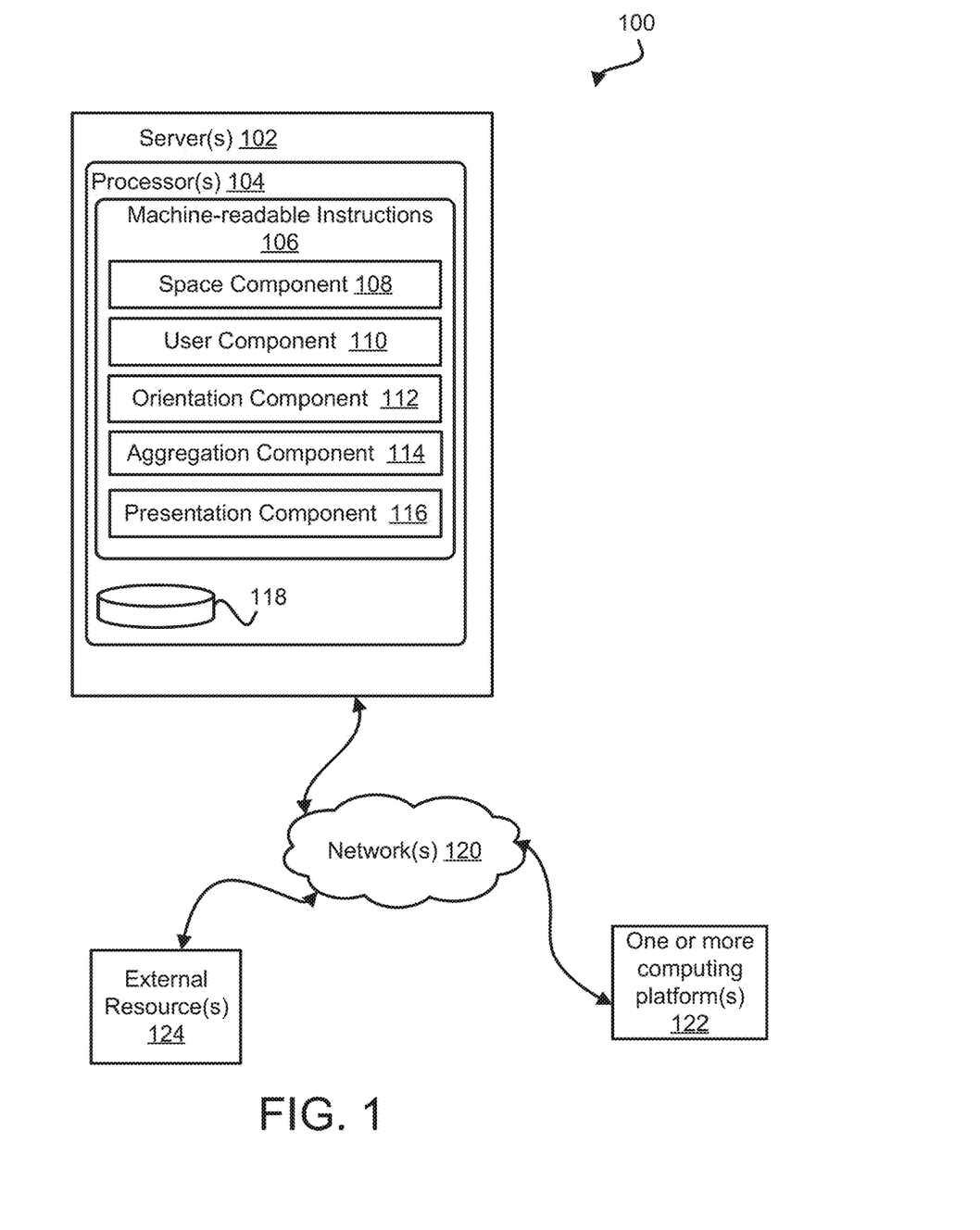
FIG. 1 illustrates a system configured to simulate user presence in a real-world three-dimensional space, in accordance with one or more implementations.

FIG. 1 illustrates a system 100 configured to simulate user presence in a real-world three-dimensional space, in accordance with one or more implementations. The simulation of user presence may be accomplished by aggregating a representation of the user with a representation of the real-world three-dimensional space. The user may be at a different location than a location in the real-world three-dimensional space in which the user's presence may be simulated. The aggregate of representation of the real-world three-dimensional at a first location and the representation of the user physically present at a second location may include a representation of the user depicted as being present within the representation of the first location in the real-world three-dimensional space.

The system 100 may include one or more of one or more servers 102, one or more computing platforms 122, and/or other components. The one or more servers 102 may include one or more of one or more physical processors 104, non-transitory electronic storage 118, and/or other components. The non-transitory electronic storage 118 may be configured to store information utilized by one or more servers 102, one or more computing platforms 122, and/or other components of system 100.

In some implementations, one or more servers 102 may be configured to provide remote hosting of features and/or functions of machine-readable instructions 106 to one or more computing platforms 122. The one or more computing platform 122 may be remotely located from one or more servers 102. The one or more servers 102 may communicate with one or more computing platforms 122 via client/server architecture, and/or other communication schemes. In some implementations, one or more features and/or functions of one or more servers 102 may be attributed as local features and/or functions of one or more computing platforms 122. For example, individual computing platforms may obtain machine-readable instructions that may be the same or similar to machine-readable instructions 106 of one or more physical processors 104. Individual computing platforms of one or more computing platforms 122 may include one or more of a mobile computing platform (e.g., one or more of a cellular telephone, a smartphone, a laptop, a tablet computer, a virtual reality platform, and/or other computing platforms), a stationary computing platform (e.g., a desktop computer), and/or other computing platforms. In some implementations, a virtual reality platform may include a virtual reality headset (e.g., goggles, glasses, and/or other headset), and/or other virtual reality platform.

Individual computing platforms of one or more computing platforms 122 may include one or more of a display, one or more sensors, and/or other components. A display may be configured to present one or more of individual images, video, text, and/or other information. Presentation via a display of a computing platform may be facilitated by one or more processors of the computing platform and/or other components. By way of non-limiting example, presentation may be facilitated by a graphics processing unit (GPU) and/or other processing components of an individual computing platform. A display may include one or more of screen, a touchscreen, a monitor, a head-mounted display, and/or other displays.

Individual sensors of an individual computing platform may be configured to generate output signals. An individual sensor may include one or more of an image sensor, an orientation sensor, a location sensor, and/or other sensors.

In some implementations, an image sensor may be configured to generate output signals conveying visual information and/or other information. Visual information conveyed from output signals of an image sensor may represent a real-world space within a field-of-view of the image sensor. In some implementations, visual information conveyed from output signals of an image sensor may define one or more of an image, an image sequence, a video, and/or other representations of a real-world space. An image may be defined by a set of pixels and/or other information. Individual pixels in the set of pixels may include one or more of a pixel location, a pixel color, and/or other specifications. A pixel location may include a two-dimensional location on a two-dimensional image plane. Pixel color may be defined by chromaticity of colors specified within a color space, such as an RGB color space. An image sensor may include one or more of a charge-coupled device sensor, an active pixel sensor, a complementary metal-oxide semiconductor sensor, an N-type metal-oxide-semiconductor sensor, and/or other devices.

In some implementations, an orientation sensor of a computing platform may be configured to generate output signals conveying orientation information and/or other information. Orientation information derived from output signals of an orientation sensor may define an orientation of the computing platform. In some implementations, orientation of a computing platform may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, Electronic nose, Infrared Imagers, Micro-bolometers, micro-displays (DMD), Digital micro-mirror device, Optical Switches, and/or other devices.

In some implementations, a location sensor of a computing platform may be configured to generate output signals conveying location information and/or other information. Location information derived from output signals of a location sensor may define one or more of a geo-location of the computing platform, an elevation of the computing platform, and/or other measurements. A location sensor may include one or more of a GPS, an altimeter, a pressure sensor, and/or other devices.

The one or more physical processors 104 may be configured by machine-readable instructions 106. Executing machine-readable instructions 106 may cause one or more physical processors 104 to facilitate simulating user presence in a real-world three-dimensional space. The machine-readable instructions 106 may include one or more computer program components. The one or more computer program components may include one or more of a space component 108, a user component 110, an orientation component 112, an aggregation component 114, a presentation component 116, and/or other components.

The space component 108 may be configured to obtain space information and/or other information. The space information may define a representation of a real-world three-dimensional space at one or more locations in the real-world three-dimensional space. The representation of a location in the three-dimensional real-world space defined by space information may include the location in which the presence of one or more users may be simulated. By way of non-limiting illustration, one or more users of system 100 may not be physically present at the one or more locations in the real-world three-dimensional space associated with the space information. An individual location in the real-world three-dimensional space may include one or more of objects, people, and/or other entities present in and/or moving through the real-world three-dimensional space.

In some implementations, a representation of a real-world three-dimensional space may include a three-dimensional digital model of the real-world three-dimensional space. In some implementations, a digital model may represent the real-world three-dimensional space virtually (e.g., as a virtual space). In some implementations, a digital model may represent the real-world three-dimensional space realistically (e.g., real-world virtual reality). One or more computer modeling techniques for creating a 3D digital model of a location by using depth maps may be used. Depth maps may be created using depth sensors, stereo cameras, and/or other devices. In some implementations, semiautomatic techniques may be used that may differentiate between foreground, background, and/or intermediate levels. Lighting of a 3D model may change depending on an hour, date, and/or climate forecast (e.g., rain may be simulated on the virtual world).

A three-dimensional model of the real-world three-dimensional space may be defined by one or more of appearance information, spatial information, and/or other information.

Appearance information defining a model of a location in the real-world three-dimensional space may include one or more images of the location. Appearance information defining a three-dimensional model of the location in the real-world three-dimensional space may generated by an image sensor such as an active pixel sensor (APS), and/or other devices.

In some implementations, spatial information may model physical features of a location in the real-world three-dimensional space. By way of non-limiting illustration, spatial information may include a depth map of the location. A depth map may be generated by a depth camera and/or other devices. Depth cameras may be configured to generate real-time depth maps of a real-world space. A depth map may include a set of points (also known as a point cloud). Individual points in a depth map may correspond to a discrete distance measurement captured by the depth camera from a 3D point in the space. A depth camera may include one or more of a laser range scanner, a time-of-flight camera, an illumination unit, an image sensor, driver electronics, computation/Interface RF-modulated light sources with phase detectors, and/or other devices.

In some implementations, appearance information and spatial information may be combined to generate a model. For example, objects, people, surfaces, and/or other content depicted in one or more images of the real-world three-dimensional space may be mapped to their corresponding locations based on the spatial information in order to realistically reproduce both the look of an appearance and the physical extent of the physical space.

In some implementations, space component 108 may be configured to obtain space information defining a representation of a real-world three-dimensional space at a closed location in the real-world three-dimensional space. A closed location may include a building interior (e.g., a room, a hallway, and/or other closed interior space of a building), and/or other locations.

The user component 110 may be configured to obtain user information for one or more users and/or other information. User information for an individual user may define an individual representation of the user in the real-world three-dimensional space. In some implementations, the representation of the user may represent one or more of an appearance of the user, a pose of the user, and/or other features. An appearance of a user may refer to a real-world physical appearance of the user and/or at least part of the user. By way of non-limiting illustration, an appearance of a user may include an appearance of a bust portion of the user, a face of the user, the entire body of the user, and/or other portions of the user. A pose of a user may refer to one or more of a posture of the user, position of the users' arms, position of the users' legs, and/or other user features.

In some implementations, user information may be determined from output signals of one or more sensors of a computing platform, and/or other information. By way of non-limiting illustration, user information may be derived from visual information derived from output signals of an image sensor. The visual information may define an image of a location in a real-world three-dimensional space. The user may be present in the location in the real-world three-dimensional space and may be depicted in the image. The representation of the user may be an image of the user derived from the image of the real-world three-dimensional space including the user. By way of non-limiting illustration, the image may be a "selfie" image of the user in a location in a real-world three-dimensional space. The user information may define a portion of the image including the depiction of the user. In some implementation, the representation of the user may be a real-world representation of the user.

In some implementations, an image of the user derived from the image of the real-world three-dimensional space including the user may be generated by one or more image processing techniques. By way of non-limiting illustration, an outline of the user may be differentiated from a background of an image (e.g., portions of the image not depicting the user). The background may be cropped out. The one or more image processing techniques may include one or more of object recognition, edge detection, facial recognition, computer vision, background subtraction, and/or other techniques.

In some implementations, a representation of a user may be a virtual representation of the user. A virtual representation of the user may be determined from visual information derived from output signals of an image sensor. The visual information may define an image of the real-world three-dimensional space. The user may be present in the real-world three-dimensional space and may be depicted in the image. A real-world representation of the user may be determined from the image. The virtual representation may be determined from the real-world representation of the user. By way of non-limiting illustration, a virtual representation may include an avatar (or other virtual entity) that may be generated to represent (e.g., match and/or substantially match) a real-world appearance of the user. This may include generating one or more of a virtual face of an avatar that represents an appearance of user's face, a virtual body of the avatar that represents an appearance of user's body and/or body type, virtual clothing that represents an appearance of the user's clothing, and/or other virtual representations. In some implementations, techniques used to generate a virtual representation may include one or more of face features extraction techniques that map to similar features in virtual world avatars (e.g., big mouth detected—big mouth drawn in the avatar, blue eyes detected—blue eyes drawn, etc.), depth sensor-based techniques (e.g., a depth sensor to detect parts of the body and their movement and map them to the avatar), other sensor based techniques (e.g., using motion sensors to track movement of the user and map them to the avatar), and/or other techniques.

The orientation component 112 may be configured to obtain orientation information derived from output signals generated by one or more orientation sensor of one or more computing platforms. By way of non-limiting illustration, orientation information for a computing platform may define an orientation of the computing platform at a current location of the computing platform in a real-world three-dimensional space.

The aggregation component 114 may be configured to generate image information for one or more users. Image information may define an image depicting a user as present in a location in the real-world they may not be physically present. Image information may be determined based on one or more of space information defining a representation of the real-world three-dimensional space at a first location in the real-world three-dimensional space, the user information defining a representation of a user in the real-world three-dimensional space physically present at a second location, orientation information defining an orientation of a computing platform associated with the user at the second location, and/or other information. The image information for an individual user may define an individual image. The individual image may depict an aggregate of a representation of the user and the representation of a three-dimensional real-world space. The representation of the user may be depicted in the image as being present at the other location in the real-world three-dimensional space.

In some implementations, aggregation component 114 may be configured to determine a representation of the real-world three-dimensional space at a first location in which a user's presence may be simulated based on orientation information and/or other information. The aggregation component 114 may be configured to determine a field-of-view of the real-world three-dimensional space at the first location based on an orientation of a computing platform associated with the user who may be physically present at a second location. The field-of-view of the real-world three-dimensional space at the first location may include a portion of the real-world three-dimensional space at the first location. The orientation of the computing platform may be used to determine a corresponding orientation within the representation of the real-world three-dimensional space at the first location (e.g., the three-dimensional model). The corresponding orientation within the representation of the real-world three-dimensional space at the first location may determine the field-of-view within the representation of the real-world three-dimensional space at the first location (e.g., the three-dimensional model).

In some implementations, the corresponding orientation within the representation of the real-world three-dimensional space at the first location may be determined with respect to a reference point in the real-world three-dimensional space at the first location. The reference point may include, for example, a point where one or more devices may have been placed in the first location in the real-world three-dimensional space when collecting information (e.g., appearance information and/or spatial information) to generate a model. A representation of a portion the location in the real-world three-dimensional space within a field-of-view in the first location corresponding to the determined orientation of the computing platform may be determined. As the orientation of computing platform may be changed by the user in the second location, a corresponding updated representation of the portion the location in the real-world three-dimensional space within an updated field-of-view of the first location may be determined. The computing platform physically present at the second location may act as a window into the first location in the real-world three-dimensional space.

By way of non-limiting illustration, aggregation component 114 may be configured to obtain, from space component 108, information defining a first image depicting the real-world three-dimensional space within a field-of-view of the real-world three-dimensional space at the first location. The aggregation component 114 may be configured to obtain, from user component 110, information defining a second image depicting the user in the real-world three-dimensional space at the second location. The aggregation component 114 may be configured such that generating image information defining an image may comprise aggregating the first image, the second image, and/or other images. In some implementations, aggregating the first image, the second image, and/or other images may include one or more of performing background subtraction, superimposing (and/or overlaying) the second image and/or other images over the first image and/or other images, and/or other image processing operations. In some implementations, examples of techniques used to aggregate a virtual representation/avatar into a 3D model of a location may include one or more of utilizing algorithms to adapt color styles of the virtual world and the avatar (e.g., bilateral filtering), utilizing data from position of body/face to represent the avatar and also change what the user sees, lighting techniques (e.g., used to give cohesion to the virtual world and avatar positions).

In some implementations, presentation component 116 may be configured to effectuate presentation, on individual computing platforms, of views of one or more of one or more representations of one or more users physically present at one or more locations, one or more representations of one or more portions of an other location in the real-world three-dimensional space within one or more fields-of-view of the other location, and/or other information other information.

In some implementations, presentation component 116 may be configured to effectuate presentation on an individual computing platform of views of one or more of an individual representation of an individual user physically present at a location, one or more representations of one or more portions of an other location in the real-world three-dimensional space within one or more fields-of-view of the other location, and/or other information. In some implementations, the one or more representations of one or more portions of the other location in the real-world three-dimensional space within the one or more fields-of-view of the other location may be presented in real-time based on changes in orientation of the individual computing platform of the user. In some implementations, when a desired field-of-view of the other location is obtained based on user movement, the user may provide input (e.g., via a user interface, not shown in FIG. 1). Responsive to obtaining the user input, presentation component 116 may instruct aggregating component 114 to generate image information defining the aggregate image using a current representation of a portion of the real-world three-dimensional space within the desired field-of-view and a representation of the user.

In some implementations, presentations effectuated on multiple different computing platforms associated with multiple different users may include presentations of a shared representation of a particular location in the real-world three-dimensional space. The shared representation of the particular location in the real-world three-dimensional space on multiple computing platforms may refer to an instance of the model of the particular location in the real-world three-dimensional space being persistent between the multiple computing platforms. Multiple users may collaborate to simulate their presence at the particular location. At an individual computing platform, by virtue of using a persistent model, a presentation of the shared representation of the particular location in the real-world three-dimensional space may include representations of one or more other users of other computing platforms depicted as being present at the particular location.

Figure 3:
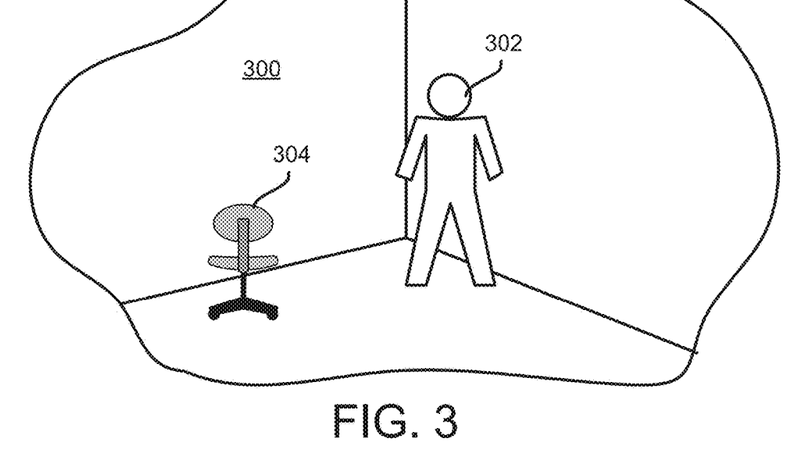
FIG. 3 illustrates a first location in a real-world three-dimensional space where user presence may be simulated.

FIG. 3 illustrates a first location 300 in real-world three-dimensional space where user presence may be simulated. The first location 300 may include one or more of one or more people (e.g., person 302), one or more objects (e.g., object 304), and/or other entities present in and/or moving through the first location 300 in the real-world three-dimensional space.

Figure 4:
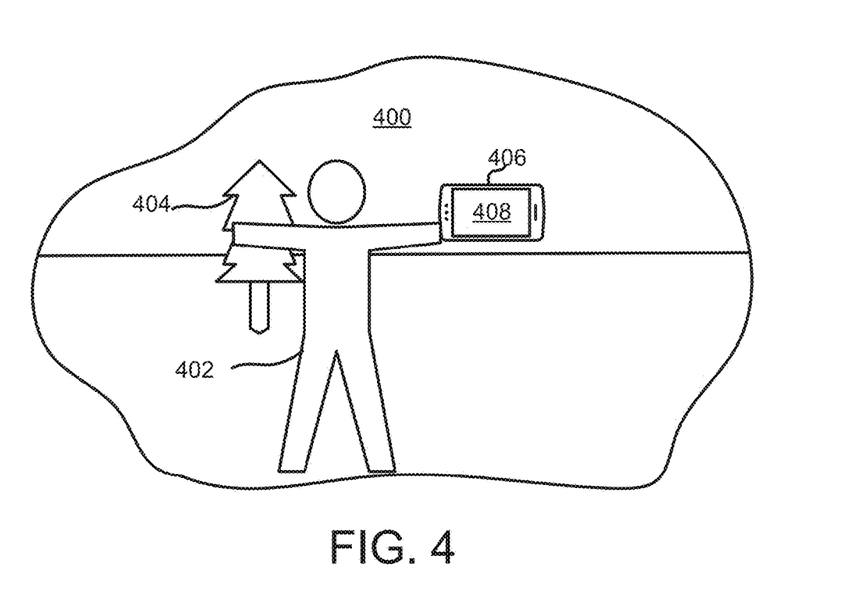
FIG. 4 illustrates a second location in a real-world three-dimensional space including a user of the system of FIG. 1.

FIG. 4 illustrates a second location 400 in real-world three-dimensional space including a user 402 of system 100 (FIG. 1). The second location 400 may include one or more of one or more people, one or more objects (e.g., object 404), and/or other entities present in and/or moving through second location 400 in the real-world three-dimensional space. The user 402 may utilize a computing platform 406 (e.g., such as an individual one of one or more computing platforms 122 in FIG. 1), and/or other devices. The computing platform 406 may include a display 408, one or more sensors (e.g., an orientation sensor, an image sensor, and/or other sensors), and/or other components. It is noted that the depiction of computing platform 406 comprising a handheld device (e.g., a smartphone) is provided for illustrative purposes only and is not to be considered limiting. For example, in some implementations, computing platform 406 may comprise a virtual reality platform and/or other computing platform. A virtual reality platform may be configured to provide the user an immersive experience into a different location. User input via a virtual reality platform may be provided by one or more of gesture and/or motion tracking/detection, input via an external device (e.g., a handheld controller, and/or other devices), and/or other input mechanisms.

Figure 5:
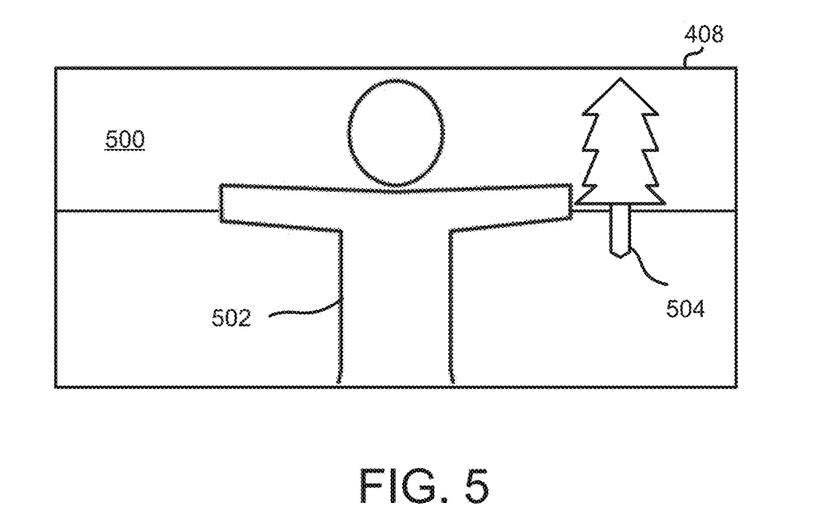
FIG. 5 illustrates a display of a computing platform showing a representation of the user at the second location.

FIG. 5 illustrates display 408 of computing platform 406 (FIG. 4) showing a representation 502 of user 402 (FIG. 4) and representation 500 of second location 400 (FIG. 4). For example, the representation 502 of user 402 and representation 500 of second location 400 may include an image presented on display 408 based on the user 402 (FIG. 4) taking a picture of themselves in second location 400 (FIG. 4).

Figure 6:
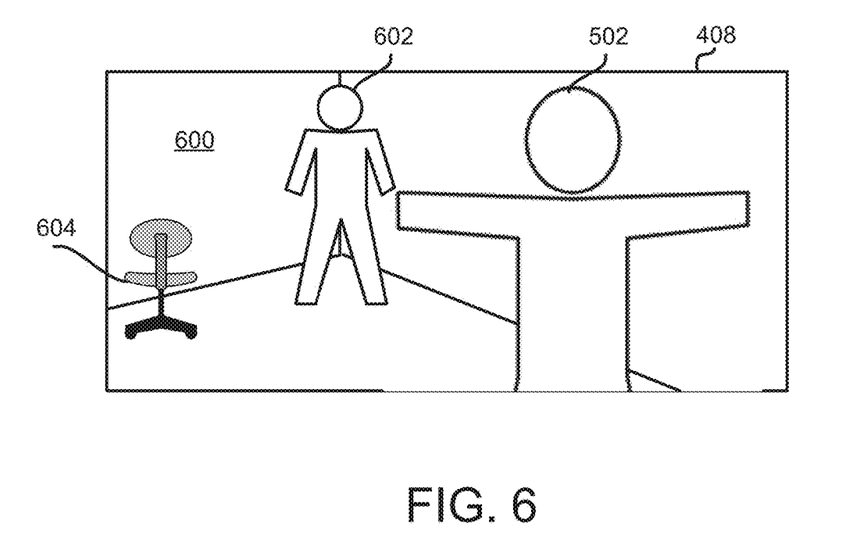
FIG. 6 illustrates a display of a computing platform showing a representation of the user depicted as being present within a first representation of the real-world three-dimensional space at the first location in the real-world three-dimensional space.
Figure 7:
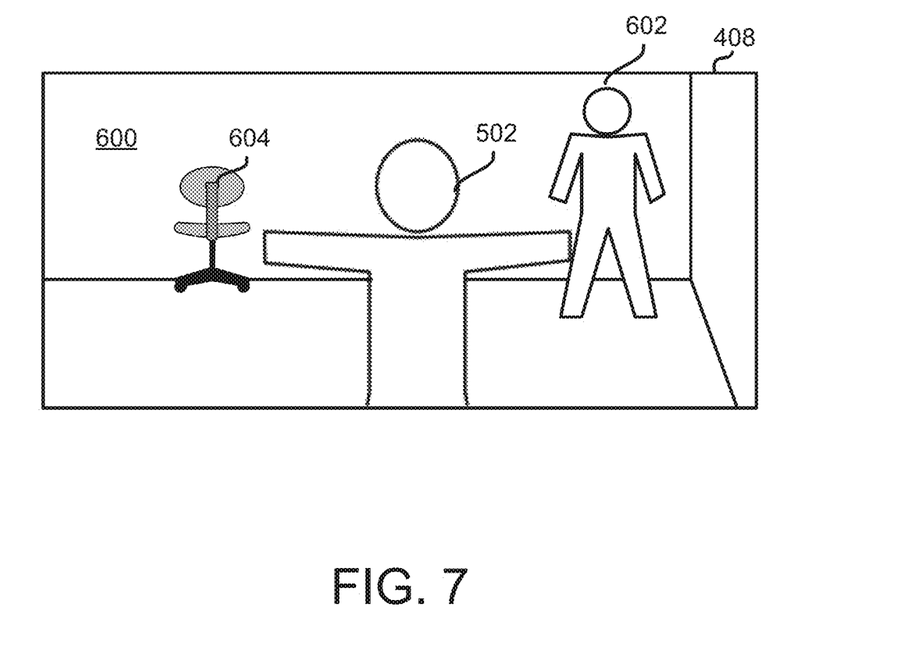
FIG. 7 illustrates a display of a computing platform showing a representation of the user depicted as being present within a second representation of the real-world three-dimensional space at the first location in the real-world three-dimensional space.

FIGS. 6-7 show images defined by image information which show representation 502 of the user 402 (FIG. 4) depicted as being present at first location 300 (FIG. 3) in the real-world three-dimensional space. The first location 300 (FIG. 3) in the displayed images includes a representation 600 of a portion of the real-world three-dimensional space at first location 300. The representation 600 of the portion of the real-world three-dimensional space at first location 300 may include one or more of a representation 602 of person 302 (FIG. 3), a representation 604 of object 304 (FIG. 3), and/or other content.

FIG. 6 illustrates display 408 of computing platform 406 (FIG. 4) showing representation 502 of user 402 (FIG. 4) depicted as being present within representation 600 of a portion of the real-world three-dimensional space at first location 300 (FIG. 3) within a first field-of-view. The first field-of-view may correspond to a first orientation of computing platform 406 (FIG. 6) in second location 400 (FIG. 4).

FIG. 7 illustrates display 408 of computing platform 406 (FIG. 4) showing representation 502 of user 402 (FIG. 4) depicted as being present within representation 600 of a portion of the real-world three-dimensional space at first location 300 (FIG. 3) within a second field-of-view. The second field-of-view may correspond to a second orientation of computing platform 406 (FIG. 6) in second location 400 (FIG. 4).

Returning to FIG. 1, server(s) 102, one or more computing platforms 122, external resources 124, and/or other components may be operatively linked via one or more electronic communication links. For example, such electronic communication links may be established, at least in part, via one or more networks 120. One or more networks 120 may include the Internet and/or other networks. It will be appreciated that this is not intended to be limiting and that the scope of this disclosure includes implementations in which components of system 100 may be operatively linked via some other communication media.

External resources 124 may include sources of information, hosts, and/or providers of information outside of system 100, external entities participating with system 100, and/or other resources. In some implementations, some or all of the functionality attributed herein to external resources 124 may be provided by resources included in system 100.

Server(s) 102 may include communication lines or ports to enable the exchange of information with a network and/or computing platform(s) 122. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 118 may include electronic storage media that electronically stores information. The electronic storage media of electronic storage 118 may include one or both of system storage that is provided integrally (i.e., substantially non-removable) with server(s) 102 and/or removable storage that is removably connectable to server(s) 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). Electronic storage 118 may store software algorithms, information determined by processor(s) 104, information received from computing platform(s) 122, and/or other information that enables system 100 to function as described herein.

Processor(s) 104 may be configured to provide information-processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-116. Processor(s) 104 may be configured to execute components 108-116 by software; hardware; firmware; some combination of software, hardware, and/or firmware; and/or other mechanisms for configuring processing capabilities on processor(s) 104.

It should be appreciated that although components 108-116 are illustrated in FIG. 1 as being co-located within a single processing unit, in implementations in which processor(s) 104 includes multiple processing units, one or more of components 108-116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-116 described above is for illustrative purposes and is not intended to be limiting, as any of components 108-116 may provide more or less functionality than is described. For example, one or more of components 108-116 may be eliminated, and some or all of its functionality may be provided by other ones of components 108-116 and/or other components. As another example, processor(s) 104 may be configured to execute one or more additional components that may perform some or all of the functionality attributed to one of components 108-116.

Figure 2:
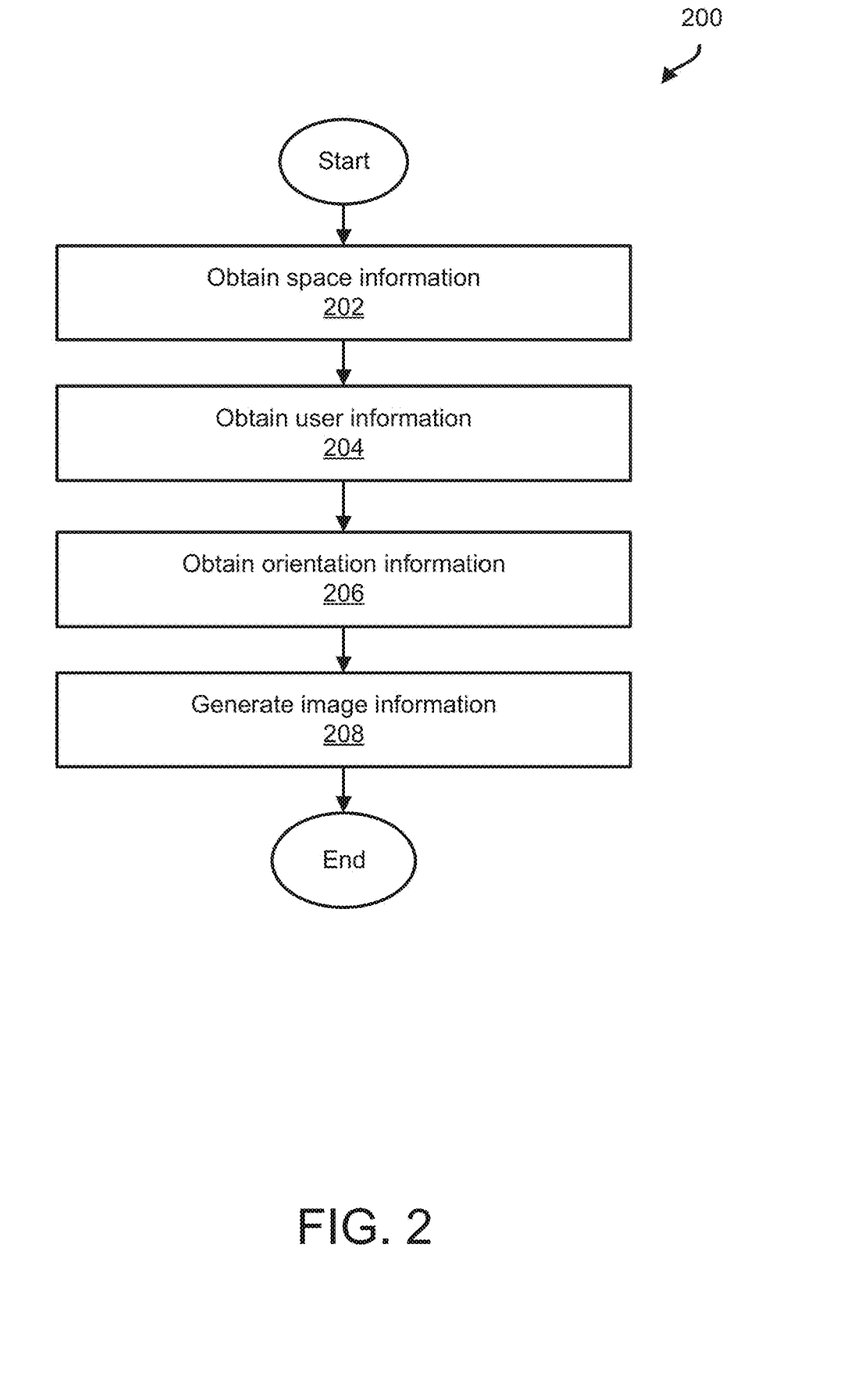
FIG. 2 illustrates a method to simulate user presence in a real-world three-dimensional space, in accordance with one or more implementations.

FIG. 2 illustrates a method 200 to simulate user presence in a real-world three-dimensional space, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, space information may be obtained. The space information may define a representation of a real-world three-dimensional space at a first location in the real-world three-dimensional space. The first location in the real-world three-dimensional space may include one or more of objects, people, and/or other entities present in and/or moving through the real-world three-dimensional space. In some implementations, operation 202 may be performed by one or more physical processors executing a space component the same as or similar to space component 108 (shown in FIG. 1 and described herein).

At an operation 204, user information may be obtained. User information may be derived from output signals generated by an image sensor of a computing platform associated with a user. The user information may define a representation of a user physically present at a second location in the real-world three-dimensional space. The representation of the user may represent one or more of an appearance of the user, a pose of the user, and/or other user features. In some implementations, operation 204 may be performed by one or more physical processors executing a user component the same as or similar to user component 110 (shown in FIG. 1 and described herein).

At an operation 206, orientation information may be obtained. Orientation information may be derived from output signals generated by an orientation sensor of the computing platform. The orientation information may define an orientation of the computing platform at the second location in the real-world three-dimensional space. In some implementations, operation 206 may be performed by one or more physical processors executing a orientation component the same as or similar to orientation component 112 (shown in FIG. 1 and described herein).

At an operation 208, image information may be generated. Image information may be generated based on one or more of space information, user information, orientation information, and/or other information. The image information may define an image, and/or other content. The image may depict an aggregate of the representation of the user and the representation of the first location. The representation of the user may be depicted in the image as being present at the first location in the real-world three-dimensional space. In some implementations, operation 208 may be performed by one or more physical processors executing an aggregation component the same as or similar to aggregation component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to simulate user presence in a real-world three-dimensional space, the system comprising:
   one or more physical processors configured by machine-readable instructions to:
      obtain space information, the space information defining a representation of a real-world three-dimensional space at a first location in the real-world three-dimensional space, the first location in the real-world three-dimensional space including objects and/or people present in and/or moving through the real-world three-dimensional space;
      obtain user information derived from output signals generated by an image sensor of a computing platform associated with a user, the computing platform and the user being physically present at a second location in the real-world three-dimensional space, the user information defining a representation of the user, the representation of the user representing an appearance and/or a pose of the user in the real-world three-dimensional space at the second location;
      obtain orientation information derived from output signals generated by an orientation sensor of the computing platform, the orientation information defining an orientation of the computing platform at the second location in the real-world three-dimensional space;

generate image information based on the space information, the user information, and the orientation information, the image information defining an image, the image depicting an aggregate of the representation of the user and the representation of the real-world three-dimensional space at the first location, wherein the representation of the real-world three-dimensional space at the first location depicted in the image is determined based on the orientation information; and effectuate presentation at the computing platform of the image depicting the aggregate of the representation of the user and the representation of the real-world three-dimensional space at the first location, such that the user viewing the image on the computing platform perceives themselves as being present at the first location.

2. The system of claim 1, wherein generating the image information comprises:

determining a field-of-view of the real-world three-dimensional space at the first location based on the orientation of the computing platform; and generating the image information such that the representation of the user is depicted in the image as being present at the first location within the field-of-view of the real-world three-dimensional space at the first location.

3. The system of claim 2, wherein generating the image information defining the image comprises:

obtaining information defining a first image depicting the real-world three-dimensional space within the field-of-view of the real-world three-dimensional space at the first location;

obtaining information defining a second image depicting the representation of the user in the real-world three-dimensional space at the second location; and generating the image information defining the image by aggregating the first image and the second image.

4. The system of claim 3, wherein the second image depicting the representation of the user is a self-portrait image.

5. The system of claim 1, wherein the representation of the real-world three-dimensional space is a real-world representation of the real-world three-dimensional space.

6. The system of claim 5, wherein the representation of the user is a real-world representation of the user.

7. The system of claim 5, wherein the representation of the user is a virtual representation of the user.

8. The system of claim 1, wherein representation of the real-world three-dimensional space at the first location includes representations of one or more other users of other computing platforms depicted as being present at the first location.

9. The system of claim 1, wherein the representation of the real-world three-dimensional space at the first location in the real-world three-dimensional space is a digital model of the first location.

10. A method to simulate user presence in a real-world three-dimensional space, the method being implemented in a computer system comprising one or more physical processors and storage media storing machine-readable instructions, the method comprising:

obtaining space information, the space information defining a representation of a real-world three-dimensional space at a first location in the real-world three-dimensional space, the first location in the real-world three-dimensional space including objects and/or people present in and/or moving through the real-world three-dimensional space;

obtaining user information derived from output signals generated by an image sensor of a computing platform associated with a user, the computing platform and the user being physically present at a second location in the real-world three-dimensional space, the user information defining a representation of the user, the representation of the user representing an appearance and/or a pose of the user in the real-world three-dimensional space at the second location;

obtaining orientation information derived from output signals generated by an orientation sensor of the computing platform, the orientation information defining an orientation of the computing platform at the second location in the real-world three-dimensional space;

generating image information based on the space information, the user information, and the orientation information, the image information defining an image, the image depicting an aggregate of the representation of the user and the representation of the real-world three-dimensional space at the first location, wherein the representation of the real-world three-dimensional space at the first location depicted in the image is determined based on the orientation information; and effectuating presentation at the computing platform of the image depicting the aggregate of the representation of the user and the representation of the real-world three-dimensional space at the first location, such that the user viewing the image on the computing platform perceives themselves as being present at the first location.

11. The method of claim 10, wherein generating the image information comprises:

determining a field-of-view of the real-world three-dimensional space at the first location based on the orientation of the computing platform; and generating the image information such that the representation of the user is depicted in the image as being present at the first location within the field-of-view of the real-world three-dimensional space at the first location.

12. The method of claim 11, wherein generating the image information defining the image comprises:

obtaining information defining a first image depicting the real-world three-dimensional space within the field-of-view of the real-world three-dimensional space at the first location;

obtaining information defining a second image depicting the representation of the user in the real-world three-dimensional space at the second location; and generating the image information defining the image by aggregating the first image and the second image.

13. The method of claim 12, wherein the second image depicting the representation of the user is a self-portrait image.

14. The method of claim 10, wherein the representation of the real-world three-dimensional space is a real-world representation of the real-world three-dimensional space.

15. The method of claim 14, wherein the representation of the user is a real-world representation of the user.

16. The method of claim 14, wherein the representation of the user is a virtual representation of the user.

17. The method of claim 10, wherein representation of the real-world three-dimensional space at the first location includes representations of one or more other users of other computing platforms depicted as being present at the first location.

18. The method of claim 10, wherein the representation of the real-world three-dimensional space at the first location in the real-world three-dimensional space is a digital model of the first location.

* * * * *